United States Patent [19]
Highsmith et al.

[11] Patent Number: 5,624,045
[45] Date of Patent: Apr. 29, 1997

[54] STORAGE RACK HAVING LATCHED BEAM-TO-COLUMN CONNECTION

[75] Inventors: Charles E. Highsmith; Joseph F. Benton, both of Springfield, Tenn.

[73] Assignee: Unarco Material Handling, Inc., Springfield, Tenn.

[21] Appl. No.: 405,509

[22] Filed: Mar. 16, 1995

[51] Int. Cl.$^6$ .................................................. A47B 43/00
[52] U.S. Cl. .......................... 211/192; 211/191; 403/353; 403/315
[58] Field of Search ........................ 211/192, 193; 248/221.11, 221.12, 222.14; 403/353, 319, 315, 316; 5/288, 299, 300, 290

[56] References Cited

U.S. PATENT DOCUMENTS

| | | | |
|---|---|---|---|
| 2,639,443 | 5/1953 | Strybel | 5/299 |
| 3,273,720 | 9/1966 | Seiz | 211/148 |
| 3,392,848 | 7/1968 | McConnell et al. | 211/192 |
| 3,456,970 | 7/1969 | Sunadky | 287/189.35 |
| 3,512,653 | 5/1970 | Erismann | 211/192 |
| 3,565,264 | 2/1971 | Guiher | 211/177 |
| 3,881,829 | 5/1975 | James | 403/27 |
| 3,986,318 | 10/1976 | McConnell | 57/758 R |
| 4,074,812 | 2/1978 | Skubic et al. | 211/192 |
| 4,131,204 | 12/1978 | Jacoby et al. | 211/192 |
| 4,165,944 | 8/1979 | Sunasky | 403/254 |
| 4,189,250 | 2/1980 | Abbott et al. | 403/190 |
| 4,222,542 | 9/1980 | Wilson et al. | 248/243 |
| 4,285,436 | 8/1981 | Konstant et al. | 211/192 |
| 4,423,817 | 1/1984 | Monjo-Rufi | 211/187 |
| 4,496,061 | 1/1985 | Highsmith | 211/192 X |
| 4,536,904 | 8/1985 | Whitehead | 5/201 |
| 4,955,743 | 9/1990 | King | 403/254 |
| 5,131,781 | 7/1992 | Klein | 403/254 |

*Primary Examiner*—Ko Chan
*Attorney, Agent, or Firm*—Dressler, Goldsmith, Milnamow & Katz, Ltd.

[57] ABSTRACT

In a storage rack, a beam is connected at one end to the column having a front wall with a vertical array of similar apertures and a side wall. Each aperture is wider at an upper region and narrower at a lower region. A flanged member has a side flange integral with the end of the beam and a front flange. A connecting pin mounted rigidly to the front flange and projecting through a selected aperture has an inner head narrower than the upper region of the selected aperture but wider than the lower region thereof and a shank narrower than the lower region thereof. A latching pin mounted to the front flange so as to be slidably movable along a vertical slot of the front flange and projecting through a separate aperture has an outer head wider than the vertical slot, an inner head narrower than the upper region of the separate aperture but wider than the lower region thereof, and a shank and is biased gravitationally along the vertical slot so that its shank continues to pass through the lower region of the separate slot, even if the beam is lifted to a position where the inner head of the connecting pin can pass through the upper region of the selected aperture, unless the latching pin is lifted to a position where the inner head of the latching pin can pass through the upper region of the separate aperture. Two connecting pins may be similarly employed.

13 Claims, 4 Drawing Sheets

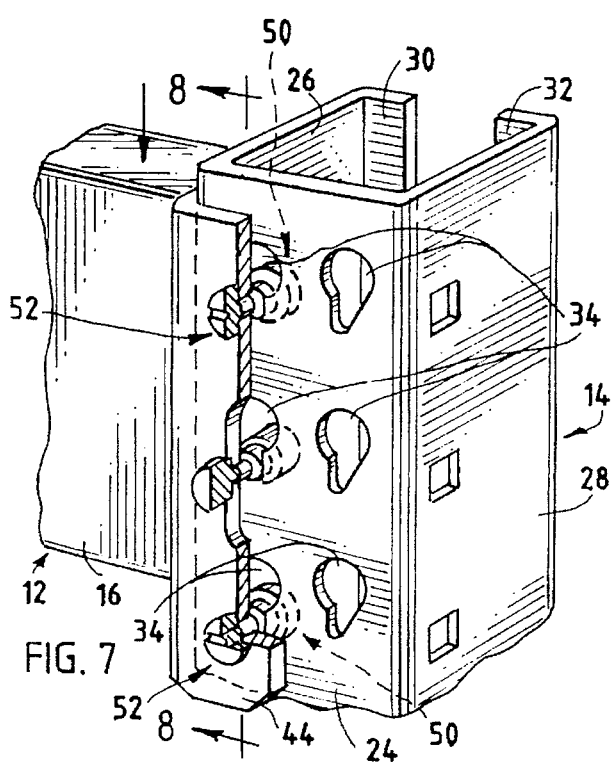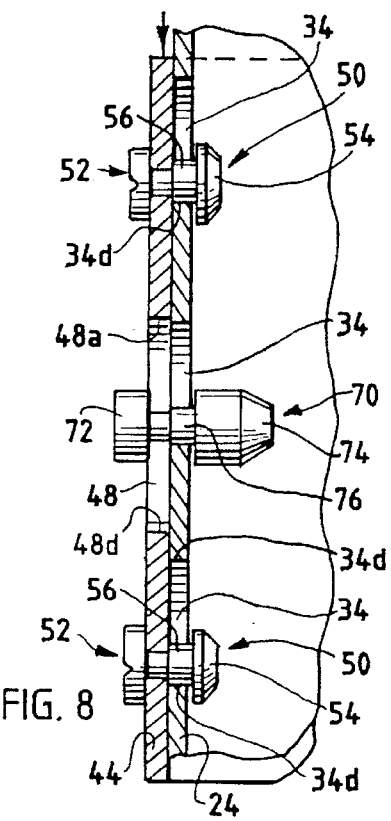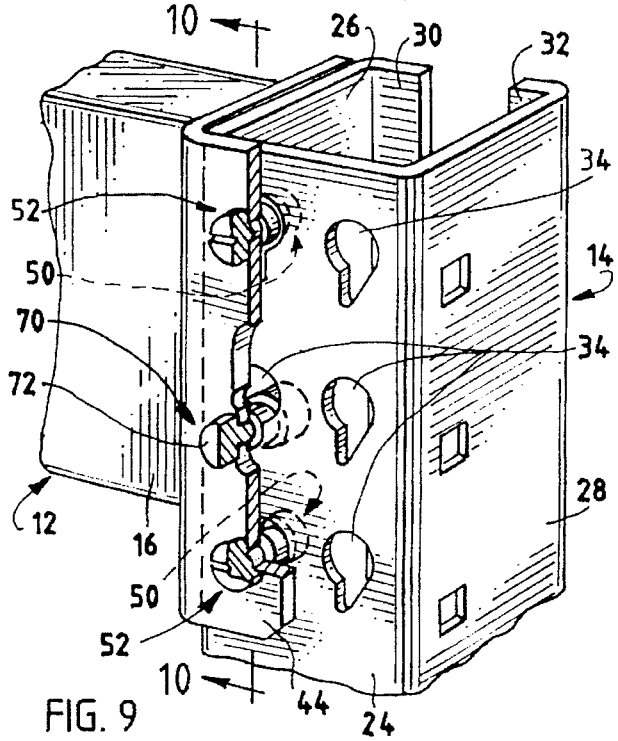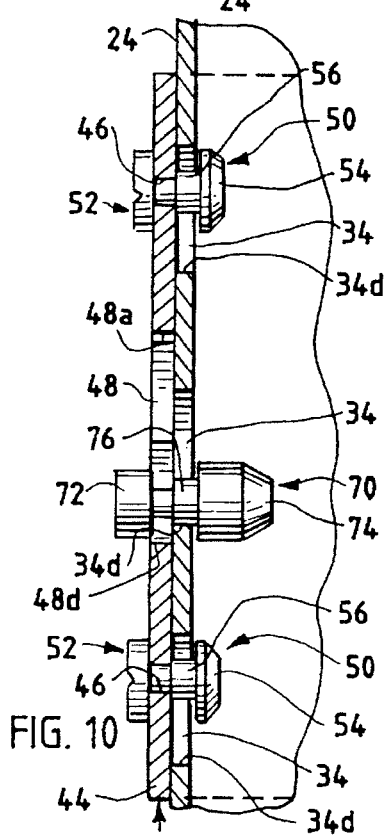
FIG. 7
FIG. 8
FIG. 9
FIG. 10

STORAGE RACK HAVING LATCHED BEAM-TO-COLUMN CONNECTION

TECHNICAL FIELD OF THE INVENTION

This invention pertains to a storage rack comprising a column, a beam, and an improved structure including a connecting pin and a latching pin for connecting the beam to the column at one end of the beam. The connecting and latching pins project from a flanged member integral with the end of the beam into similarly shaped apertures in a wall of the column. The beam remains connected to the column by the latching pin, even if the beam is lifted to a position where the connecting pin is removable from its associated aperture, unless the latching pin is lifted above a latching zone to a position where the latching pin is removable from its associated aperture.

BACKGROUND OF THE INVENTION

In a storage rack, it is common to connect a beam to a column via a flanged member having a side flange welded to one end of the beam and a front flange, from which connecting pins having inner heads project into similarly shaped apertures in a front wall of the column. Commonly, the apertures are shaped so that the inner heads of the connecting pins can pass through upper regions of the apertures but not through lower regions of the apertures. Thus, the flanged member must be lifted to permit the inner heads of the connecting pins to pass through upper regions of the apertures.

At an early date, it was realized that if the beam or the flanged member were struck by an object, such as a pallet, as the object was being lifted, the object could dislodge the flanged member from the column unless a latching or locking device was provided. Various latching or locking devices have been disclosed for latching or locking beams to columns.

As exemplified by the device 100 shown in FIGS. 12 and 13 as comprising a spring member 110, many latching or locking devices of a type in widespread use employ spring members mounted on the beams and arranged to snap into apertures in the columns. Such members must be manually flexed to permit the beam to be removed from the column. In some applications, particularly but not exclusively in home centers, warehouse stores, and other establishments where storage racks are used to display merchandise for retail sale, such latching or locking devices employing spring members may be disfavored.

There has been a need, to which this invention is addressed, for an improved structure for connecting a beam to a column at one end of the beam.

SUMMARY OF THE INVENTION

This invention provides a storage rack comprising a column, a beam, and an improved structure including a connecting pin and a latching pin for connecting the beam to the column at one end of the beam. The improved structure is arranged so that the beam is latched to the column by the latching pin, even if the end of the beam is lifted, unless the latching pin is lifted above a latching zone.

The column has a front wall with a vertical array of similar, regularly spaced apertures and a side wall. Each aperture is wider at an upper region of such aperture and narrower at a lower region of such aperture.

The connecting structure comprises a flanged member having a side flange integral with the end of the beam and a front flange having a vertical slot. The side flange is fitted against the side wall of the column. The front flange is fitted against the front wall of the column.

The connecting pin is mounted rigidly to the front flange, projects through a selected aperture of the vertical array, and is removable from the selected aperture only if lifted. The latching pin is mounted to the front flange so as to be slidably movable along the vertical slot of the front flange, projects through a separate aperture of the vertical array, and is removable from the separate aperture only if lifted.

The latching pin is biased downwardly so that the beam remains connected to the column by the latching pin, even if the end of the beam is lifted so that the connecting pin is removable from the selected aperture, unless the latching pin is lifted above a latching zone so as to be removable from the separate aperture. In the latching zone, the inner head of the latching pin is prevented from being removed from the separate aperture by a margin of the separate aperture.

Preferably, each aperture is wider at an upper region and narrower at a lower region, and the connecting pin has an inner head sized and shaped so as to be capable of passing through the upper region of the selected aperture but not through the lower region of the selected aperture and a shank interposed between the inner head of the connecting pin and the front flange and sized and shaped so as to be capable of passing through either of the upper and lower regions of the selected aperture.

Preferably, moreover, the latching pin has an outer head sized and shaped so as not to pass through the vertical slot, an inner head sized and shaped so as to be capable of passing through the upper region of the separate aperture but not through the lower region of the separate aperture, and a shank interposed between the outer and inner heads of the latching pin and sized and shaped so as to be capable of passing through the vertical slot of the front flange and through either of the upper and lower regions of the separate aperture.

Preferably, the latching pin is biased gravitationally along the vertical slot of the front flange so that the shank of the latching pin rests on the lower margin of the separate slot so as to latch the beam to the column, even if the end of the beam is lifted to a position where the inner head of the connecting pin can pass through the upper region of the selected aperture, unless the latching pin is lifted to a position where the inner head of the latching pin can pass through the upper region of the separate aperture.

Desirably, when the shank of the connecting pin rests on the lower margin of the selected aperture and the shank of the latching pin rests on the lower margin of the separate aperture, the vertical slot extends below the shank of the latching pin by a distance equal approximately to the distance of vertical movement of the connecting pin when lifted into a position where the inner head of the latching pin can pass through the upper region of the separate aperture.

In one contemplated embodiment, in which the connecting structure is useful alternatively at a right-hand installation or at a left-hand installation, the vertical slot extends above the shank of the latching pin by an approximately equal distance when the shank of the connecting pin rests on the lower margin of the selected aperture and the shank of the latching pin rests on the lower margin of the separate aperture.

In an alternative embodiment, in which the connecting structure is useful singularly at a right-hand or left-hand installation, the vertical slot does not extend substantially above the shank of the latching pin when the shank of the connecting pin rests on the lower margin of the selected aperture and the shank of the latching pin rests on the lower margin of the separate aperture.

Preferably, the inner head of the latching pin is longer than the inner head of the connecting pin, and the inner heads of the connecting and latching pins are bevelled. Preferably, the connecting pin is one of two connecting pins, each of which is mounted rigidly to the front flange and projects through a selected aperture of the vertical array. Preferably, moreover, the latching pin is mounted between the connecting pins.

These and other objects, features, and advantages of this invention are evident from the following description of two contemplated embodiments of this invention with reference to the accompanying drawings.

BRIEF DESCRIPTION OF THE DRAWINGS

FIG. 7, on the intermediate scale, is a view similar to FIGS. 4 and 5 but showing the flanged member as having been moved downwardly along the column at a final stag in connecting the beam to the column.

FIG. 8, on the larger scale, is a sectional view taken along line 8—8 of FIG. 7, in a direction indicated by arrows.

FIG. 9, on the intermediate scale, is a view similar to FIGS. 4, 5, and 7 but showing the flanged member as having been moved upwardly along the column but remaining connected to the column.

FIG. 10, on the larger scale, is a sectional view taken along line 10—10 of FIG. 9, in a direction indicated by arrows.

DETAILED DESCRIPTION OF THE ILLUSTRATED EMBODIMENTS

Figure 1:
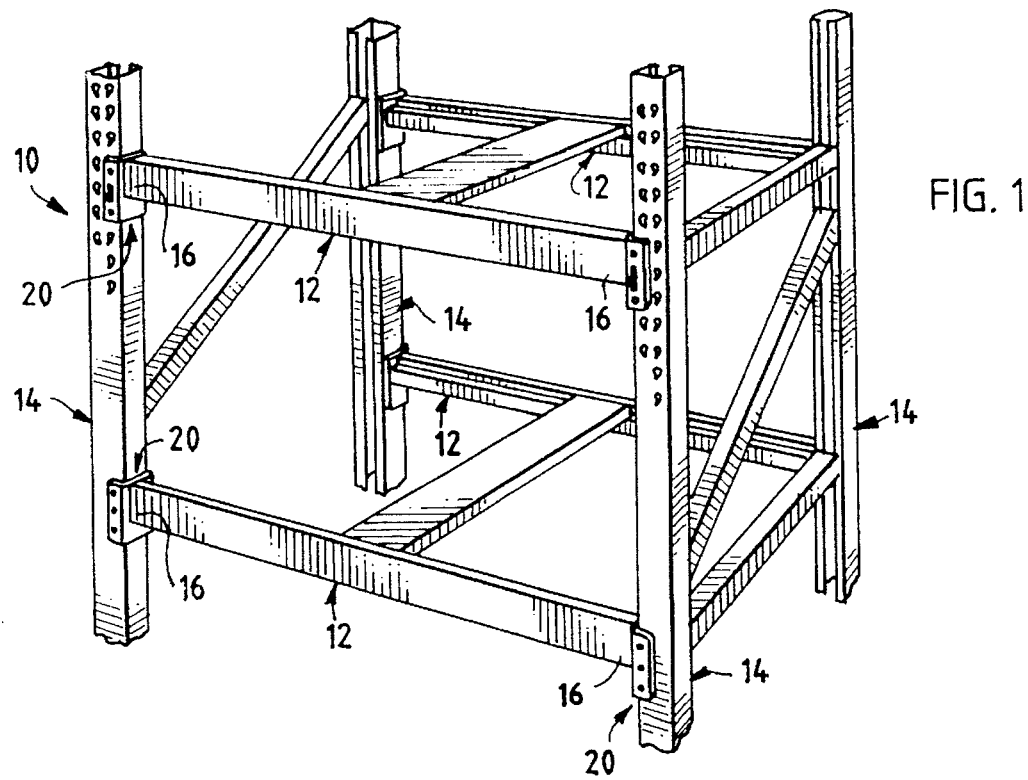
FIG. 1 is a fragmentary, perspective view of a storage rack employing a connecting structure according to a preferred embodiment of this invention.
Figure 2:
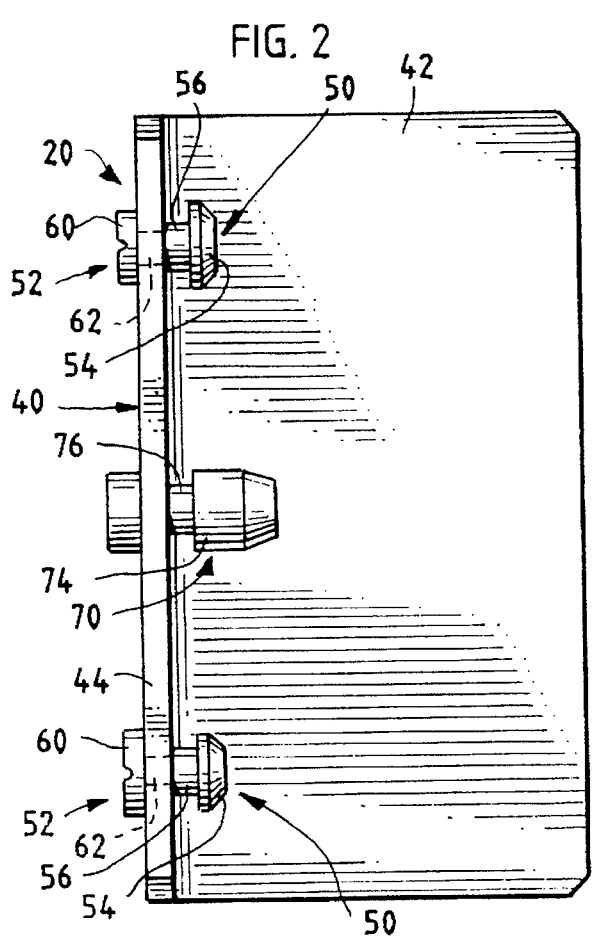
FIG. 2, on a larger scale, is an end view of a flanged structure, two connecting pins, and a latching pin at one end of one beam of the storage rack of FIG. 1.
Figure 3:
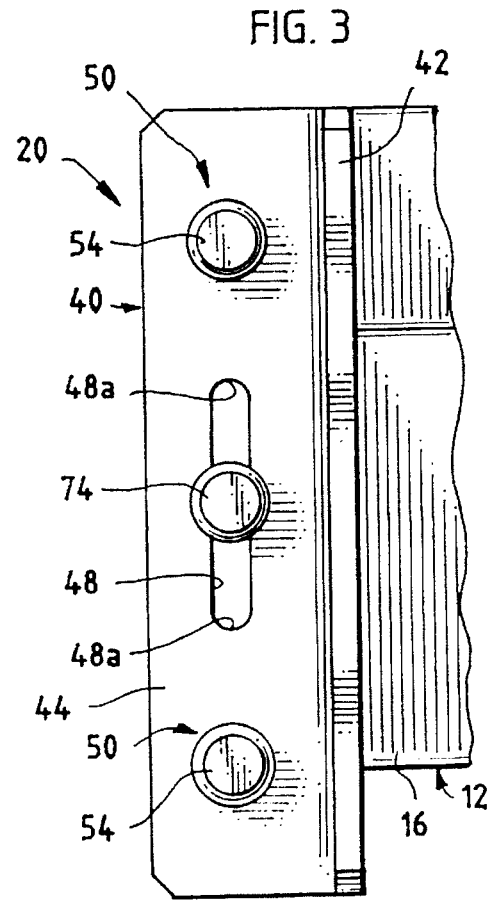
FIG. 3, on the larger scale, is a back view of the flanged structure, the connecting pins, and the latching pin, along with a fragment of the end of the beam.

As shown in FIG. 1, a storage rack 10 constitutes a preferred embodiment of this invention. In the storage rack 10, steel beams 12 of known construction are connected to steel columns 14 of known construction, at each end 16 of each beam 12, by a connecting structure 20 improved by this invention.

Figure 4:
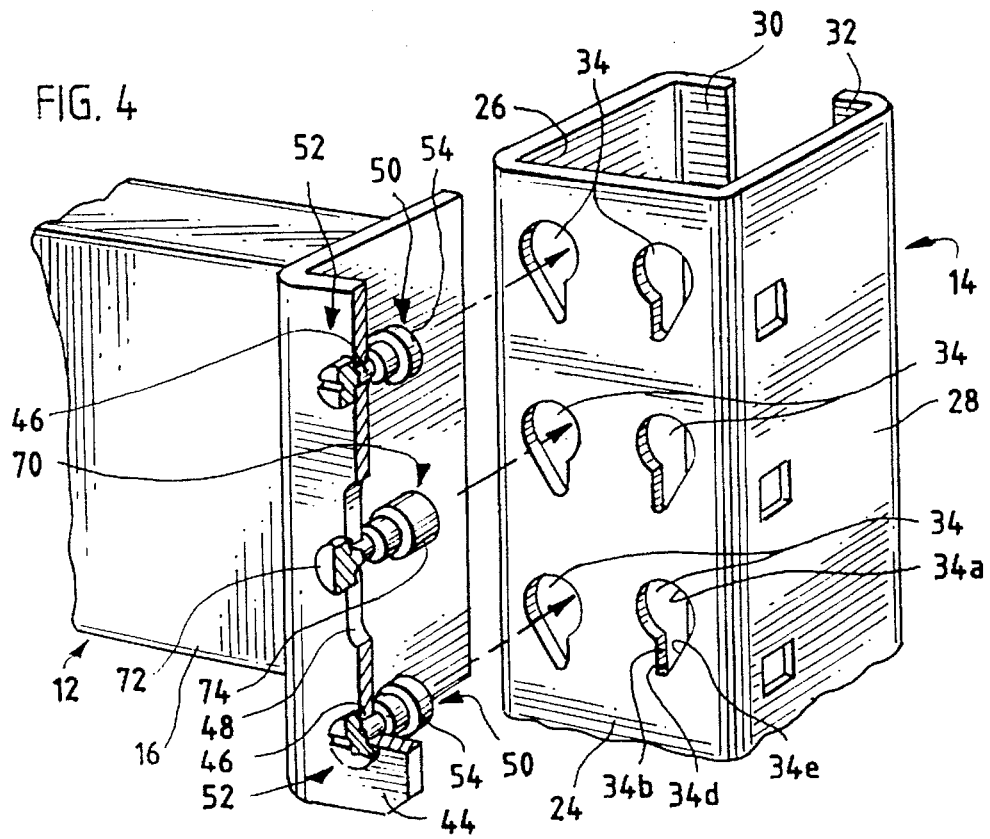
FIG. 4, on an intermediate scale, is a fragmentary, perspective view showing the flanged structure as being moved toward the column at an early stage in connecting the beam to the column.
Figure 5:
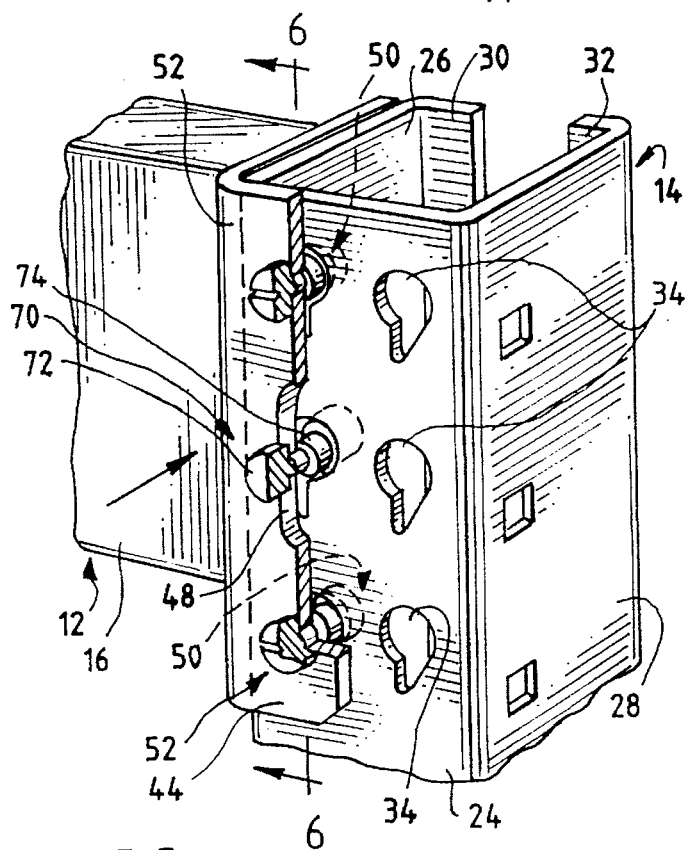
FIG. 5, on the intermediate scale, is a view similar to FIG. 5 but showing the flanged member as having been moved against the column at a later stage in connecting the beam to the column.
Figure 6:
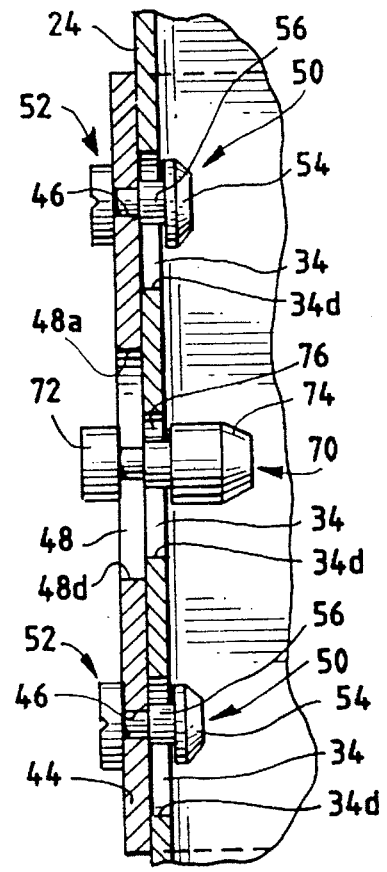
FIG. 6 on the larger scale, is a sectional view taken along line 6—6 of FIG. 5, in a direction indicated by arrows.

As shown in FIG. 4 and other views, each column 14 is fabricated from a steel plate so as to have a front wall 24, two side walls 26, 28, which extend backwardly from the front wall 24, and two back flanges 30, 32. The front wall 24 of each column 14 is provided with two parallel, vertical arrays of similar, regularly spaced, modified keyhole-shaped apertures 34, the apertures 34 being mirror images in the respective arrays.

Being modified keyhole-shaped, each aperture 34 is wider at an upper region and narrower at a lower region. As shown in FIG. 4, each aperture 34 has a circular margin 34a at the wider, upper region, and a vertical, side margin 34b, an inclined, side margin 34c, and a rounded, lower margin 34d at the narrower, lower region. Herein, directional terms, such as "upper", "lower" and "vertically", refer to the storage rack 10, as erected.

The connecting structure 20 comprises a flanged member 40 fabricated from a steel plate so as to have a side flange 42, which is perpendicular to the associated beam 12 and which is welded so as to be integral with the end 16 of the associated beam 12, and a front flange 44, which is perpendicular to the side flange 42. The front flange 44 has two holes 46 and a vertical slot 48 between the holes 44. The holes 46 and the slot 48 are aligned vertically. The vertical slot 48 has an upper margin 48a and a lower margin 48d.

Two connecting pins 50 are mounted rigidly to the front flange 44, via machine screws 52, so as to project backwardly through selected apertures 34, in whichever of the vertical arrays is nearer to the flanged member 40. Each connecting pin 50 has an inner head 54 and a shank 56 between the inner head 54 and the front flange 44. Each machine screw 52 has an outer head 60 and a shank 62 passing through one of the holes 46 in the front flange 44 and threaded into a socket (not numbered) in the shank 56 of such connecting pin 50.

Each connecting pin 50 projects backwardly through a selected one of the apertures 34. The inner head 54 of each connecting pin 50 is sized and shaped so as to be capable of passing through the wider, upper region of the selected aperture 34 but not through the narrower, lower region of the selected aperture 34. The shank 56 of each connecting pin 50 is sized and shaped so as to be capable of passing through either of the upper and lower regions of the selected aperture 34. Thus, when the end 16 of the beam 12 is connected to the column 14 by the connecting structure 20, the shank 56 of the connecting pin 50 rests on the lower margin 34d of the selected aperture 34.

Between the connecting pins 50, a latching pin 70 is mounted to the front flange 44 so as to be slidably movable along the vertical slot 48. The latching pin 70 projects backwardly through a separate one of the apertures 34, between the selected apertures 34 associated with the connecting pins 50, and in the same array. The latching pin 70 has an outer head 72 sized and shaped so as not to pass through the vertical slot 48. The latching pin 70 has an inner head 74 sized and shaped so as to be capable of passing through the wider, upper region of the separate aperture 34 but not through the narrower, lower region of the separate aperture 34. The latching pin 70 has a shank 76 interposed between the outer head 72 and the inner head 74. The shank 76 is sized and shaped so as to be capable of passing through the vertical slot of the front flange and through either of the upper and lower regions of the separate aperture 34.

The latching pin 70 is biased gravitationally, by its own weight, along the vertical slot 48. The vertical slot 48 extends below the shank 76 of the latching pin 70 to the lower margin 48a, when the shanks 56 of the connecting pins 50 rest on the lower margins 34d of the lower regions of the selected apertures 34 and the shank 76 of the latching pin 70 rests on the lower margin 34d of the separate aperture 34, by a distance equal approximately to the distance of vertical movement of the connecting pins 50 when lifted into positions where the inner heads 54 can pass through the upper regions of the selected apertures 34.

Thus, the shank 76 of the latching pin 70 rests on the lower margin 34d of the separate aperture 34 so as to latch the beam 12 to the column 14, even if the associated end 16 of the beam 12 is lifted to a position where the inner heads 54 of the connecting pins 50 can pass through the upper regions of the selected apertures, unless the latching pin 70 is lifted above a latching zone to a position where the inner head 74 of the latching pin 70 can pass through the upper region of the separate aperture. In the latching zone, the inner head 74 of the latching pin 70 is prevented from being removed from the separate aperture 34 by one or more of the margins 34b, 34c, 34d, of the lower region of the separate aperture 34. As an example, the latching zone may extend vertically for approximately ½ inch.

When it is desired to disconnect the beam 12 from the column 14, the latching pin 40 may be so lifted above the latching zone before, when, or after the flanged member 40 is lifted. However, if the flanged member 40 is lifted accidentally by an object striking the beam 12 or the flanged member 40, the beam 12 remains latched to the column 14 by the latching pin 40 so long as the latching pin 70 remains in the latching zone.

As shown, the inner heads 54 of the connecting pins 50 and the inner head 74 of the latching pin 70 are bevelled, so as to facilitate their entry into the respective apertures 34. Moreover, the inner head 74 of the latching pin 70 is longer than the inner heads 54 of the connecting pins 50, so as to project further and so as to require the inner head 74 of the latching pin 70 to be first inserted into the separate aperture 43 before the inner heads 54 of the connecting pins 50 are inserted into the selected apertures 34. Thus, when the beam 12 is connected to the column 14, the inner heads 54 of the connecting pins 50 can be easily inserted into the selected apertures 34 once the inner head 74 of the latching pin 70 has been inserted into the separate aperture 34.

In the preferred embodiment, as shown in FIGS. 1 through 10, the vertical slot 48 extends above the shank 76 of the latching pin 70 to the upper margin 48a, when the shanks 56 of the connecting pins 50 rest on the lower margins 34d of the selected apertures 34 and the shank 76 of the latching pin 70 rests on the lower margin 34d of the separate aperture 34, by an approximately equal distance. Thus, the connecting structures 20 at the opposite ends 16 of the beam 12 may be substantially identical but inverted with respect to each other, so as to be alternatively useful at right-hand or left-hand installations.

Figure 11:
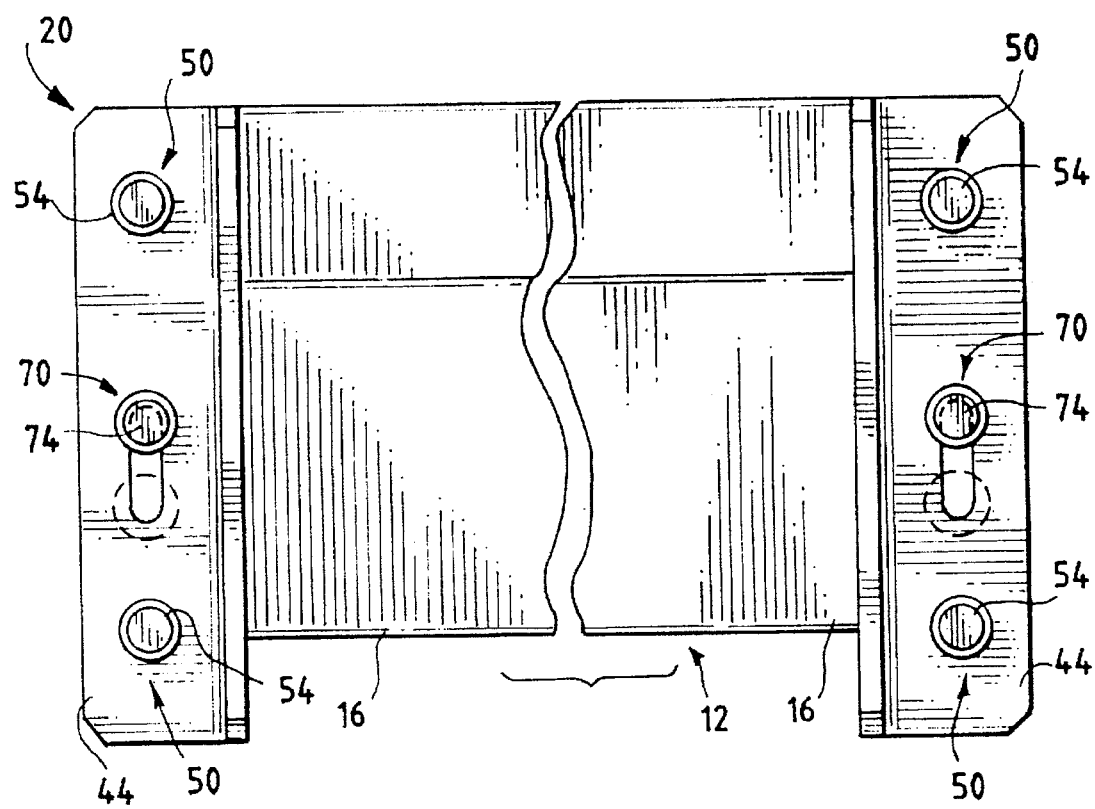
FIG. 11, is a fragmentary, elevational view of a beam employing, at each of its ends, a connecting structure according to an alternative embodiment of this invention.

In an alternative embodiment, as shown in FIG. 11, the vertical slot 48 does not extend substantially above the shank 76 of the latching pin 70 when the shanks 56 of the connecting pins 50 rest on the lower margins 34d of the selected apertures 34 and the shank 76 of the latching pin 70 rests on the lower margin 34d of the separate aperture 34. Thus, the connecting structures 20 at the opposite ends of the beam 12 are singularly useful at right-hand or left-hand installations but not both.

Figure 12:
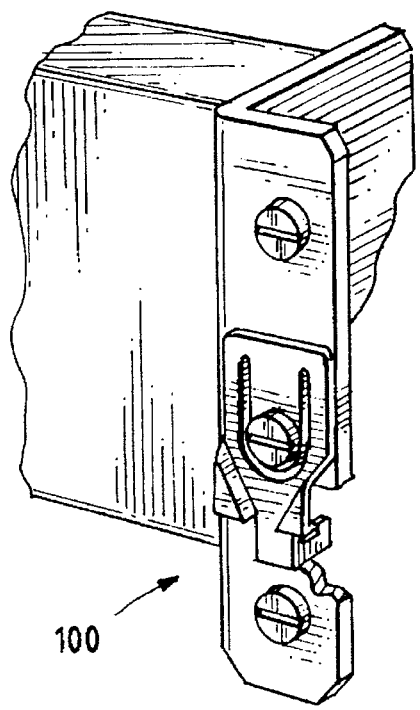
FIG. 12 is a fragmentary, perspective view of a connecting structure exemplifying prior art.
Figure 13:
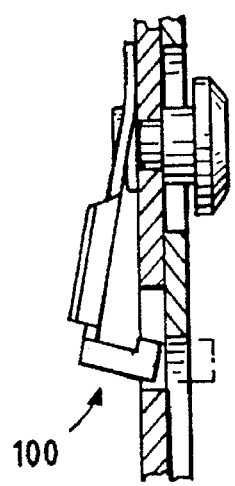
FIG. 13 is a fragmentary, sectional view of the connecting structure shown in FIG. 12.

A connecting structure according to the preferred or alternative embodiment described above is superior for many applications, particularly when compared to a latching or locking device employing a spring member, as exemplified by the device 100 shown in FIGS. 12 and 13 as employing the spring member 110.

Various modifications may be made in the preferred and alternative embodiments described above without departing from the scope and spirit of this invention.

We claim:

1. A storage rack comprising a column, a beam, and means for connecting the beam to the column at one end of the beam and latching the beam to the column, even if the beam is lifted in relation to the column, the column having a front wall with a vertical array of similar, spaced apertures and a side wall, each aperture having an upper region and a lower region with the lower region being narrower in width than the upper region, and each aperture having a continuous margin defined by the front wall, the connecting means comprising (a) a flanged member having a side flange integral with the end of the beam and a front flange, the side flange being fitted against the side wall of the column, the front flange being fitted against the front wall of the column, the front flange having a vertical slot extending between an upper margin defined by the front flange and a lower margin defined by the front flange, (b) a connecting pin mounted rigidly to the front flange and projecting through a selected one of said apertures of the vertical array, the connecting pin defining an axis and having an inner head sized and shaped so as to be capable of passing axially through the upper region of the selected aperture but not axially through the lower region of the selected aperture and a shank interposed between the inner head of the connecting pin and the front flange, sized and shaped so as to be capable of passing axially through either of the upper and lower regions of the selected aperture, the inner head of the connecting pin being spaced axially from the front flange by a fixed distance, and (c) a latching pin mounted to the front flange so as to be slidably movable along the vertical slot of the front flange and projecting through a separate one of the apertures of the vertical array, the latching pin defining an axis and having an outer head sized and shaped so as not to pass axially through the vertical slot and an inner head sized and shaped so as to be capable of passing axially through the upper region of the separate aperture but not axially through the lower region of the separate aperture, the latching pin having a shank interposed between the outer and inner heads of the latching pin and sized and shaped so as to be capable of passing axially through the vertical slot of the front flange and axially through either of the upper and lower regions of the separate aperture, the latching pin being biased gravitationally along the vertical slot of the front flange so that the shank of the latching pin rests on the lower margin of the separate slot so as to latch the beam to the column, even if the beam is lifted in relation to the column to a position where the inner head of the connecting pin can pass axially through the upper region of the selected aperture, unless the latching pin is lifted along the vertical slot, above a latching zone, in which the inner head of the latching pin is prevented by the margin at the lower region of the separate aperture from being removed through the separate aperture, to a position where the inner head of the latching pin can pass axially through the upper region of the separate aperture.

2. The storage rack of claim 1 wherein the vertical slot extends below the shank of the latching pin, when the shank of the connecting pin rests on the lower margin of the selected aperture and the shank of the latching pin rests on the lower margin of the separate aperture, by a distance equal approximately to the distance of vertical movement of the connecting pin when lifted into said position where the inner head of the connecting pin can pass through the upper region of the selected aperture.

3. The storage rack of claim 2 wherein the vertical slot extends above and below the shank of the latching pin, by approximately equal distances, when the shank of the connecting pin rests on the lower margin of the selected aperture and the shank of the latching pin rests on the lower margin of the separate aperture.

4. The storage rack of claim 3 wherein there are two of said connecting pins, each connecting pin being mounted rigidly to the front flange and projecting through a selected one of the apertures of the vertical array, the latching pin being mounted between the connecting pins.

5. The storage rack of claim 2 wherein the vertical slot does not extend above the shank of the latching pin when the shank of the connecting pin rests on the lower margin of the selected aperture and the shank of the latching pin rests on the lower margin of the separate aperture.

6. The storage rack of claim 5 wherein there are two said connecting pins, each connecting pin being mounted rigidly to the front flange and projecting through a selected one of the apertures of the vertical array, the latching pin being mounted between the connecting pins.

7. A storage rack comprising a column, a beam, and means for connecting the beam to the column at one end of the beam and latching the beam to the column, even if the beam is lifted in relation to the column, the column having a front wall with a vertical array of similar, spaced apertures and a side wall, each aperture having an upper region and a lower region with the lower region being narrower in width than the upper region, each aperture having a continuous margin defined the front flange, the connecting means comprising a flanged member having a side flange integral with the end of the beam and a front flange having a vertical slot, the side flange being fitted against the side wall of the column, the front flange being fitted against the front wall of the column, a connecting pin mounted rigidly to the front flange and projecting through a selected one of the apertures of the vertical array, the connecting pin being removable from the selected aperture only if the beam is lifted to an elevated position, and a latching pin mounted to the front flange so as to be slidably movable along the vertical slot of the front flange and projecting through a separate aperture of the vertical array, the latching pin defining an axis and being removable axially from the separate aperture only if lifted, the latching pin having an inner head and being biased downwardly so that the beam remains latched to the column by the latching pin, even if the beam is lifted to the elevated position where the connecting pin is removable from the selected aperture, and so that the beam is detached from the column by further lifting the latching pin above a latching zone, in which the inner head of the latching pin is prevented by the margin at the lower region of the separate aperture from being removed axially through the separate aperture, so as to be removable axially from the separate aperture.

8. The storage rack of claim 7 wherein there are two of said connecting pins, each connecting pin being mounted rigidly to the front flange and projecting through a selected one of the apertures of the vertical array, the latching pin being mounted between the connecting pins.

9. A storage rack comprising a column, a beam, and means for connecting the beam to the column at one end of the beam, the column having a front wall with a vertical array of similar, spaced apertures and a side wall, each aperture having an upper region and a lower region with the lower region being narrower in width than the upper region, the connecting means comprising a flaged member having a side flange integral with the end of the beam and a front flange having a vertical slot, the side flange being fitted against the side wall of the column, the front flange being fitted against the front wall of the column, a connecting pin mounted rigidly to the front flange and projecting through a selected one of said apertures of the vertical array, the connecting pin being removable from the selected aperture only if lifted, and a latching pin mounted to the front flange so as to be slidably movable along the vertical slot of the front flange and projecting through a separate aperture of the vertical array, the latching pin being removable from the separate aperture only if lifted, the latching pin having an inner head and being biased downwardly so that the beam remains connected to the column by the latching pin, even if the beam is lifted to a position where the connecting pin is removable from the selected aperture, and the beam is detached from the column by further lifting the latching pin above a latching zone, in which the inner head of the latching pin is prevented by a margin of the separate aperture from being removed through the separate aperture, so as to be removable from the separate aperture, wherein the connecting pin has an inner head and wherein the inner head of the latching pin is longer than the inner head of the connecting pin.

10. A storage rack comprising a column, a beam, and means for connecting the beam to the column at one end of the beam, the column having a front wall with a vertical array of similar, spaced apertures and a side wall, each aperture having an upper region and a lower region with the lower region being narrower in width than the upper region, the connecting means comprising a flanged member having a side flange integral with the end of the beam and a front flange having a vertical slot, the side flange being fitted against the side wall of the column, the front flange being fitted against the front wall of the column, a connecting pin mounted rigidly to the front flange and projecting through a selected one of said apertures of the vertical array, the connecting pin being removable from the selected aperture only if lifted, and a latching pin mounted to the front flange so as to be slidable movable along the vertical slot of the front flange and projecting through a separate aperture of the vertical array, the latching pin being removable from the separate aperture only if lifted, the latching pin having an inner head and being biased downwardly so that the beam remains connected to the column by the latching pin, even if the beam is lifted to a position where the connecting pin is removable from the selected aperture, and the beam is detached from the column by further lifting the latching pin above a latching zone, in which the inner head of the latching pin is prevented by a margin of the separate aperture from being removed through the separate aperture, so as to be removable from the separate aperture, wherein the connecting pin has an inner head and wherein the inner heads connecting and latching pins are beveled.

11. The storage rack of claim 10 wherein the inner head of the latching pin is longer than the inner head of the connecting pin.

12. The storage rack of claim 11 wherein there are two of said connecting pins, each connecting pin being mounted rigidly to the front flange and projecting through a selected one of the apertures of the vertical array, the latching means being mounted between the connecting pins.

13. The storage rack of claim 7 wherein the outer and inner heads of the latching pin are spaced axially from each other by a fixed distance.

* * * * *

UNITED STATES PATENT AND TRADEMARK OFFICE
CERTIFICATE OF CORRECTION

PATENT NO. : 5,624,045

DATED : April 29, 1997

INVENTOR(S) : Charles E. Highsmith and Joseh F. Benton

It is certified that error appears in the above-indentified patent and that said Letters Patent is hereby corrected as shown below:

Column 3, line 40, "stag" should be --stage--;

Column 4, line 15, "lower" should be --lower",--; and

Column 8, line 1, "flaged" should be --flanged--.

Signed and Sealed this

Twenty-second Day of July, 1997

*Attest:*

BRUCE LEHMAN

*Attesting Officer*  *Commissioner of Patents and Trademarks*